US012637070B2

(12) United States Patent
Huang et al.

(10) Patent No.: US 12,637,070 B2
(45) Date of Patent: May 26, 2026

(54) ANTI-COLLISION LONGITUDINAL SELF-ADAPTIVE ADJUSTING SYSTEM AND METHOD THEREOF

(71) Applicant: Optimal Intelligent Mobility Co., Ltd., Taichung City (TW)

(72) Inventors: Chi-Chun Huang, Taichung (TW); I-Chun Kuo, Taichung (TW); Jin-Yan Hsu, Taichung (TW)

(73) Assignee: Optimal Intelligent Mobility Co., Ltd., Taichung City (TW)

( * ) Notice: Subject to any disclaimer, the term of this patent is extended or adjusted under 35 U.S.C. 154(b) by 120 days.

(21) Appl. No.: 18/827,843

(22) Filed: Sep. 9, 2024

(65) Prior Publication Data

US 2026/0021806 A1    Jan. 22, 2026

(30) Foreign Application Priority Data

Jul. 18, 2024    (TW) ................................. 113126998

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/18* (2013.01); *B60W 10/22* (2013.01);
(Continued)

(58) Field of Classification Search
CPC ...... B60W 30/09; B60W 10/04; B60W 10/18; B60W 10/22; B60W 40/107;
(Continued)

(56) References Cited

U.S. PATENT DOCUMENTS 10,723,351 B1 *   7/2020   Hakki ..................... B64C 15/14
12,122,372 B2 *  10/2024   Newman ............... B60W 10/04
(Continued)

FOREIGN PATENT DOCUMENTS

CN        115195701 A   * 10/2022   .......... B60W 10/184
CN        117445804 A   *  1/2024   ............. B60Q 9/008
(Continued)

*Primary Examiner* — Babar Sarwar
(74) *Attorney, Agent, or Firm* — CKC & Partners Co., LLC

(57)    ABSTRACT

An anti-collision longitudinal self-adaptive adjusting system includes a host vehicle, an external environment sensing module, a cabin internal status sensing module and a controller. A self-adaptive deceleration command calculating unit calculates a self-adaptive deceleration command at least according to a maximum deceleration threshold, a seatbelt dataset and a passenger standing dataset and calculates a suspension damper command according to the self-adaptive deceleration command. A self-adaptive deceleration command output unit calculates a braking point distance at least according to a system operating delay time and the self-adaptive deceleration command so as to obtain a brake start-till-stop time. If the brake start-till-stop time is larger than or equal to the obstacle collision time, the self-adaptive deceleration command is output to the propulsion module and the braking module for adjusting the longitudinal velocity, and the suspension damper command is output to the suspension module for adjusting the suspension damper.

12 Claims, 3 Drawing Sheets

(51) Int. Cl.

| | |
|---|---|
| *B60W 10/18* | (2012.01) |
| *B60W 10/22* | (2006.01) |
| *B60W 40/107* | (2012.01) |
| *B60W 50/02* | (2012.01) |
| *B60W 50/14* | (2020.01) |

(52) U.S. Cl.
CPC ...... *B60W 40/107* (2013.01); *B60W 50/0205*
(2013.01); *B60W 50/14* (2013.01); *B60W
2050/143* (2013.01); *B60W 2050/146*
(2013.01); *B60W 2510/225* (2013.01); *B60W
2520/10* (2013.01); *B60W 2540/227* (2020.02);
*B60W 2552/05* (2020.02); *B60W 2552/40*
(2020.02); *B60W 2552/53* (2020.02); *B60W
2554/00* (2020.02); *B60W 2556/45* (2020.02);
*B60W 2710/18* (2013.01); *B60W 2710/22*
(2013.01); *B60W 2720/106* (2013.01)

(58) Field of Classification Search
CPC ............. B60W 50/0205; B60W 50/14; B60W
2050/143; B60W 2050/146; B60W
2510/225; B60W 2520/10; B60W
2540/227; B60W 2552/05; B60W
2552/40; B60W 2552/53; B60W 2554/00;
B60W 2556/45; B60W 2710/18; B60W
2710/22; B60W 2720/106
See application file for complete search history.

(56) References Cited

U.S. PATENT DOCUMENTS

| | | | | |
|---|---|---|---|---|
| 12,344,240 | B2 * | 7/2025 | Kario | B60W 30/0953 |
| 2007/0192030 | A1 * | 8/2007 | Tanimichi | B60W 10/22 |
| | | | | 701/301 |
| 2017/0137023 | A1 * | 5/2017 | Anderson | B60W 50/14 |
| 2018/0276844 | A1 * | 9/2018 | Takahashi | G06T 7/70 |
| 2019/0005821 | A1 * | 1/2019 | Matsunaga | G01S 13/931 |
| 2019/0096255 | A1 * | 3/2019 | Mills | G08G 1/166 |
| 2020/0189576 | A1 * | 6/2020 | Ikezawa | B60T 7/12 |
| 2023/0060112 | A1 * | 2/2023 | Marumo | B60W 60/0015 |
| 2023/0150487 | A1 * | 5/2023 | Han | B60W 10/184 |
| | | | | 701/41 |
| 2024/0083460 | A1 * | 3/2024 | Yeom | B60W 30/18163 |
| 2024/0199006 | A1 * | 6/2024 | Kario | B60W 60/0015 |

FOREIGN PATENT DOCUMENTS

| | | | | | |
|---|---|---|---|---|---|
| DE | 102022212267 | A1 * | 5/2023 | ............. | B60R 22/48 |
| EP | 1818890 | A1 * | 8/2007 | ......... | B60W 30/085 |
| EP | 4098519 | B1 * | 8/2025 | ......... | B60W 40/105 |
| KR | 20200110536 | A * | 9/2020 | ............ | B60W 50/10 |

* cited by examiner

ANTI-COLLISION LONGITUDINAL SELF-ADAPTIVE ADJUSTING SYSTEM AND METHOD THEREOF

RELATED APPLICATIONS

This application claims priority to Taiwan Application Serial Number 113126998, filed Jul. 18, 2024, which is herein incorporated by reference.

BACKGROUND

Technical Field

The present disclosure relates to a self-adaptive adjusting system and a method thereof. More particularly, the present disclosure relates to an anti-collision longitudinal self-adaptive adjusting system and a method thereof.

Description of Related Art

Prevention of traffic accidences is always a key point on the development in the vehicle technique field. An obstacle can be detected by detectors employed by a vehicle, and a collision time may be calculated, thereby allowing relative steps, e.g., decelerating or urgent braking, to be exerted by the vehicle.

However, if some of passengers stand inside the vehicle or seat without fastening the seatbelt, the urgent braking may lead to that the passengers hit or fall on the vehicle, which may cause the passengers to be injured. In addition, even the vehicle does not brake urgently, the passengers may feel uncomfortable owing to a large deceleration. Hence, there is a requirement to be improved.

SUMMARY

According to one aspect of the present disclosure, an anti-collision longitudinal self-adaptive adjusting system includes a host vehicle, an external environment sensing module, a cabin internal status sensing module and a controller. The host vehicle includes a plurality of wheels, a propulsion module configured to provide a power to the wheels, a braking module configured to provide a braking force to the wheels and to obtain a longitudinal velocity and a road surface friction coefficient as the host vehicle moves on a road, and a suspension module connected to the wheels and configured to obtain a suspension damper as the host vehicle moves on the road. The external environment sensing module is disposed at the host vehicle, and the external environment sensing module is configured to detect at least one obstacle. The cabin internal status sensing module is disposed at the host vehicle and includes a seatbelt detecting unit configured to detect whether at least a sitting member of a plurality of passengers on the host vehicle is present so as to obtain a seatbelt dataset, and a passenger standing detecting unit configured to detect whether at least a standing member of the passengers is present so as to obtain a passenger standing dataset. The controller is electrically connected to the suspension module, the propulsion module, the braking module, the external environment sensing module and the cabin internal status sensing module. The controller includes a collision risk estimating unit configured to calculate an obstacle collision time according to the at least one obstacle detected by the external environment sensing module, a maximum deceleration threshold calculating unit configured to calculate a maximum deceleration threshold according to a maximum braking deceleration of the braking module and a maximum road deceleration corresponding to the road surface friction coefficient, a self-adaptive deceleration command calculating unit configured to calculate a self-adaptive deceleration command at least according to the maximum deceleration threshold, the seatbelt dataset and the passenger standing dataset and to calculate a suspension damper command according to the self-adaptive deceleration command, and a self-adaptive deceleration command output unit configured to calculate a braking point distance at least according to a system operating delay time and the self-adaptive deceleration command so as to obtain a brake start-till-stop time. If the brake start-till-stop time is larger than or equal to the obstacle collision time, the self-adaptive deceleration command is output to the propulsion module and the braking module for adjusting the longitudinal velocity, and the suspension damper command is output to the suspension module for adjusting the suspension damper.

According to another aspect of the present disclosure, an anti-collision longitudinal self-adaptive adjusting method includes a driving motion sensing step, an external environment sensing step, a cabin internal status sensing step, a collision risk estimating step, and a longitudinal self-adaptive adjusting step. In the driving motion sensing step, a braking module of a host vehicle obtains a longitudinal velocity and a road surface friction coefficient as the host vehicle moves on a road, and a suspension module of the host vehicle obtains a suspension damper as the host vehicle moves on the road. In the external environment sensing step, an external environment sensing module detects at least one obstacle. In the cabin internal status sensing step, a seatbelt detecting unit detects whether at least a sitting member of a plurality of passengers on the host vehicle is present so as to obtain a seatbelt dataset, and a passenger standing detecting unit detects whether at least a standing member of the passengers is present so as to obtain a passenger standing dataset. In the collision risk estimating step, a controller calculates an obstacle collision time according to the at least one obstacle detected by the external environment sensing module. In the longitudinal self-adaptive adjusting step, a maximum deceleration threshold calculating unit of the controller calculates a maximum deceleration threshold according to a maximum braking deceleration of the braking module and a maximum road deceleration corresponding to the road surface friction coefficient. A self-adaptive deceleration command calculating unit of the controller calculates a self-adaptive deceleration command at least according to the maximum deceleration threshold, the seatbelt dataset and the passenger standing dataset and calculates a suspension damper command according to the self-adaptive deceleration command. A self-adaptive deceleration command output unit of the controller calculates a braking point distance at least according to a system operating delay time and the self-adaptive deceleration command so as to obtain a brake start-till-stop time. If the brake start-till-stop time is larger than or equal to the obstacle collision time, the self-adaptive deceleration command is output to a propulsion module and the braking module for adjusting the longitudinal velocity, and the suspension damper command is output to the suspension module for adjusting the suspension damper.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or intervening elements may also be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
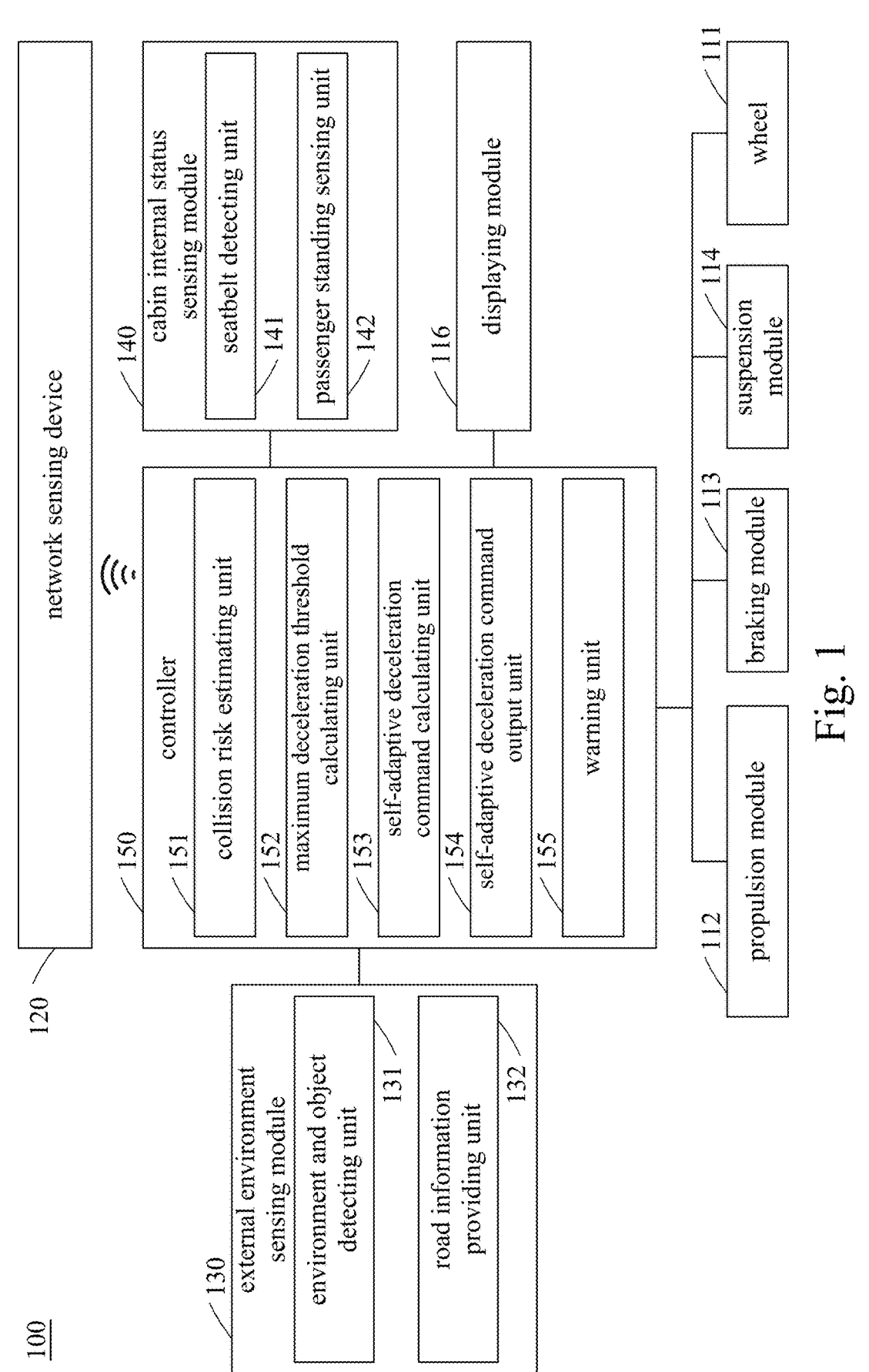
FIG. 1 shows a block diagram of an anti-collision longitudinal self-adaptive adjusting system according to one embodiment of the present disclosure.
Figure 2:
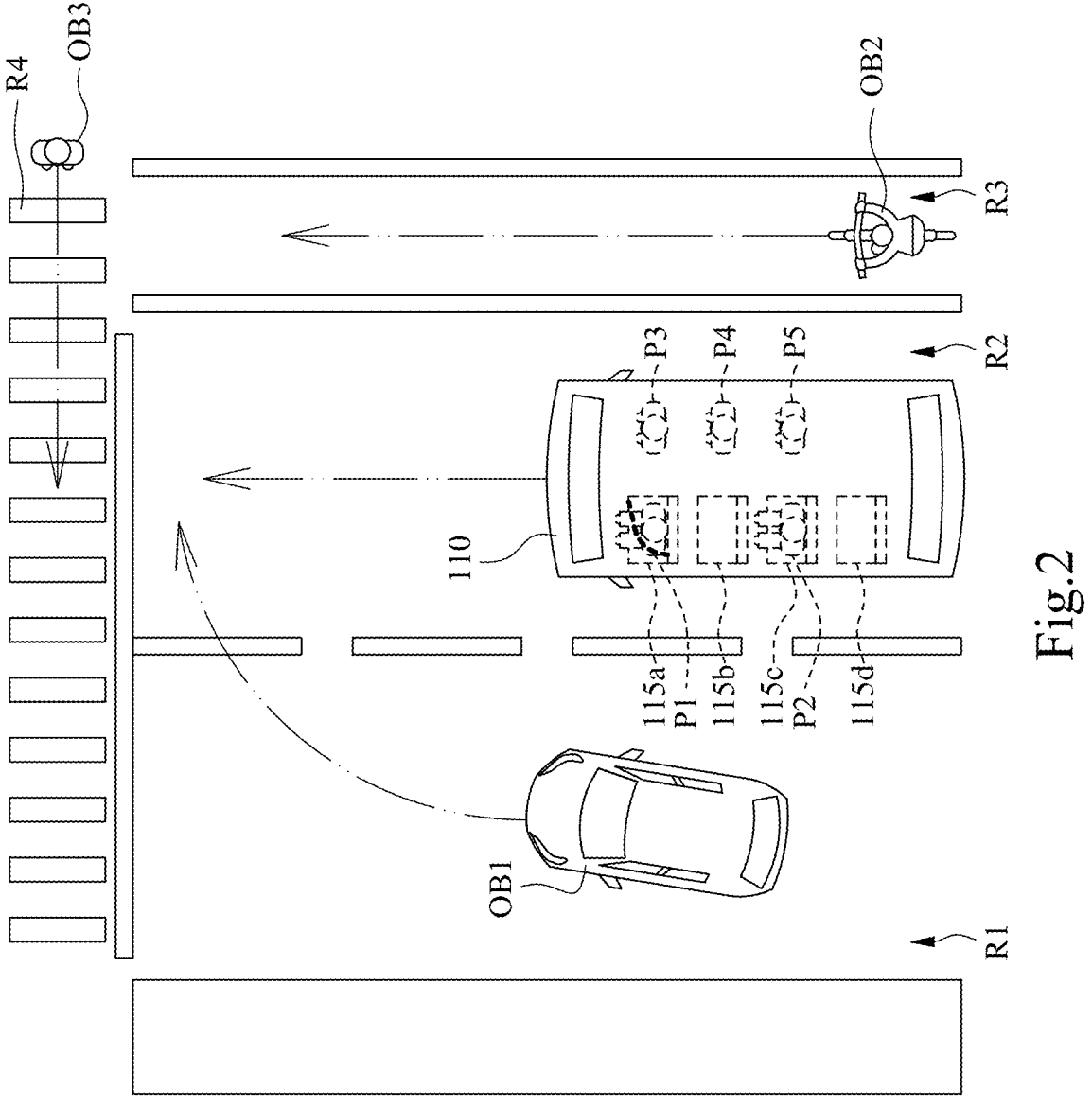
FIG. 2 shows a schematic view of the anti-collision longitudinal self-adaptive adjusting system of the embodiment of FIG. 1 applied to a road.

FIG. 1 shows a block diagram of an anti-collision longitudinal self-adaptive adjusting system 100 according to one embodiment of the present disclosure. FIG. 2 shows a schematic view of the anti-collision longitudinal self-adaptive adjusting system 100 of the embodiment of FIG. 1 applied to a road. The anti-collision longitudinal self-adaptive adjusting system 100 includes a host vehicle 110, an external environment sensing module 130, a cabin internal status sensing module 140 and a controller 150.

The host vehicle 110 includes a plurality of wheels 111, a propulsion module 112 configured to provide a power to the wheels 111, a braking module 113 configured to provide a braking force to the wheels 111 and to obtain a longitudinal velocity and a road surface friction coefficient as the host vehicle 110 moves on the road, and a suspension module 114 connected to the wheels 111 and configured to obtain a suspension damper as the host vehicle 110 moves on the road.

The external environment sensing module 130 is disposed at the host vehicle 110, and the external environment sensing module 130 is configured to detect at least one obstacle OB1, OB2, OB3. The cabin internal status sensing module 140 is disposed at the host vehicle 110 and includes a seatbelt detecting unit 141 configured to detect whether at least a sitting member of a plurality of passengers P1, P2, P3, P4, P5 on the host vehicle 110 is present so as to obtain a seatbelt dataset, and a passenger standing detecting unit 142 configured to detect whether at least a standing member of the passengers P1, P2, P3, P4, P5 is present so as to obtain a passenger standing dataset.

The controller 150 is electrically connected to the suspension module 114, the propulsion module 112, the braking module 113, the external environment sensing module 130 and the cabin internal status sensing module 140, and the controller 150 includes a collision risk estimating unit 151 configured to calculate an obstacle collision time according to the at least one obstacle OB1, OB2, OB3 detected by the external environment sensing module 130, a maximum deceleration threshold calculating unit 152 configured to calculate a maximum deceleration threshold according to a maximum braking deceleration of the braking module 113 and a maximum road deceleration corresponding to the road surface friction coefficient, a self-adaptive deceleration command calculating unit 153 configured to calculate a self-adaptive deceleration command at least according to the maximum deceleration threshold, the seatbelt dataset and the passenger standing dataset and to calculate a suspension damper command according to the self-adaptive deceleration command, and a self-adaptive deceleration command output unit 154 configured to calculate a braking point distance at least according to a system operating delay time and the self-adaptive deceleration command so as to obtain a brake start-till-stop time. If the brake start-till-stop time is larger than or equal to the obstacle collision time, the self-adaptive deceleration command is output to the propulsion module 112 and the braking module 113 for adjusting the longitudinal velocity, and the suspension damper command is output to the suspension module 114 for adjusting the suspension damper.

Therefore, with that the cabin internal status sensing module 140 obtains the status of the passengers P1, P2, P3, P4, P5 and the collision risk estimating unit 151 calculates the obstacle collision time, the self-adaptive deceleration command calculating unit 153 may calculate the suitable self-adaptive deceleration command according to the seatbelt fastening status of the passengers P1, P2, P3, P4, P5, and then the self-adaptive deceleration command output unit 154 may output the self-adaptive deceleration command to adjust the longitudinal velocity and the suspension damper, thereby effectively decreeing the possibility that the passengers P1, P2, P3, P4, P5 are injured as avoiding collision.

The host vehicle 110 may be a school bus or a bus, and include a vehicle body for carrying the passengers P1, P2, P3, P4, P5. The wheels 111 may be disposed the vehicle body. The propulsion module 112 may include an engine, a gear box, a transmission shaft, a differential, etc., to transmit the power to drive the host vehicle 110. The braking module 113 may include a brake disc, a brake pad, etc., to generate the braking force for stopping the host vehicle 110. The suspension module 114 may include a spring, a cushion mechanism, a linkage, etc., to connect the vehicle body and the wheels 111 and provide the suspension damper. The host vehicle 110 may further include a driving path changing module to change a direction of the host vehicle 110 as moving.

In the present disclosure, each of the propulsion module 112, the braking module 113 and the suspension module 114 may include sensors. Therefore, the propulsion module 112 may obtain a propulsion module feedback dataset, a propulsion module status dataset and a propulsion module diagnosing dataset. The braking module 113 may obtain a braking module feedback dataset, a braking module status dataset and a braking module diagnosing dataset, the longitudinal velocity, a lateral velocity, a longitudinal acceleration, a lateral acceleration, a longitudinal jerk, and an IMU (inertial measurement unit) dataset including a yawing angle, a rolling angle and a pitching angle. The suspension module 114 may obtain a suspension module feedback dataset, a suspension module status dataset and a suspension module diagnosing dataset. Consequently, the longitudinal velocity and the suspension damper may be obtained. Moreover, the propulsion module 112 may include an acceleration pedal, the braking module 113 may include a braking pedal, and the driving path changing module may include a steering wheel torque detector. Consequently, whether a driver controls the propulsion module 112, the braking module 113 or the driving path changing module to take over the host vehicle 110 may be confirmed. It is noted that, the way for the braking module 113 to obtain the road surface friction coefficient is conventional and is not a key point for the present disclosure, and the details will not be described.

The external environment sensing module 130 may include an environment and object detecting unit 131 and a road information providing unit 132. The environment and object detecting unit 131 may for example include a camera, a radar, a LIDAR, etc. The camera may shoot images for the controller 150 to analyze information including a curve of the lane, a number of the lanes (as two lanes R1, R2 and a bikeway R3 shown in FIG. 2), and a width of the lane, and to identify a lane marking color (red, yellow, white, etc.), a lane marking type (the number of the lanes, a solid line, a dash line, etc.) and a road type (singular, double, a cross intersection, etc.). The radar and the LIDAR are used to obtain the position datasets, the quantity datasets, the dynamic datasets (including a heading angle, relative longitudinal and lateral distances, relative longitudinal and lateral velocities, etc.), and the classified dataset (including a drain cover, a sky bridge, etc.) of the objects. Consequently, the controller 150 may obtain relative datasets to analyze the obstacles OB1, OB2, OB3. The road information providing unit 132 may include a Global Navigation Satellite System (GNSS) and a map information, and the category information of the road, including the urban, the highway, the rural, etc., and the highest velocity limitation of the road may be obtained.

Moreover, the lane marking color, the lane marking type and the road type may also be provided by a network sensing device 120. The network sensing device 120 may be signally connected (wireless signally connected) to the controller 150 so as to provide an environment object dataset, a roadside device dataset and a special object dataset (including an ambulance, a police car, etc.).

For the cabin internal status sensing module 140, the seatbelt detecting unit 141 may obtain a seated number, i.e., a number of seats 115a, 115b, 115c, 115d that are seated by the passengers P1, P2, and confirms that whether the passengers P1, P2 on the seats 115a, 115b, 115c, 115d fasten the seatbelt. The seatbelt detecting unit 141 may include a load sensor and a click sensor to detect whether the seats 115a, 115b, 115c, 115d are seated and whether the seatbelts are fastened. As shown in FIG. 2, for the four seats 115a, 115b, 115c, 115d, two seats 115a, 115c are seated respectively by the two passengers P1, P2, and the passengers P1, P2 are the sitting members. The passenger P1 on the seat 115a fastens the seatbelt, and the passenger P2 on the seat 115c does not fasten the seatbelt.

The passenger standing detecting unit 142 may include a camera which may shoot images for analyzing whether a standing member of the passengers P1, P2, P3, P4, P5 is present. As shown in FIG. 2, the passengers P3, P4, P5 are the standing members.

The controller 150 is the controlling center of the host vehicle 110 and includes a plurality of micro processers to operate different functions. The collision risk estimating unit 151 is used to calculate the obstacle collision time. As a number of the obstacles OB1, OB2, OB3 are plural, the collision risk estimating unit 151 may calculate a collision possibility of each of the obstacles OB1, OB2, OB3, and calculates the obstacle collision time according to an obstacle dataset of the obstacle OB1, OB2, OB3 that corresponds to a highest one of the collision possibilities. Precisely, the collision risk estimating unit 151 may include a collision possibility judging model, and the collision possibility judging model includes at least two hidden layers. The lane marking type, the lane marking color and the road type obtained by the external environment sensing module 130 or the network sensing device 120 are input to the collision possibility judging model, and an estimated collision time of each of the obstacles OB1, OB2, OB3 are considered to obtain the collision possibility of each of the obstacles OB1, OB2, OB3.

To be more specific, the controller 150 may analyze the object in the region of interest. As shown in FIG. 2, the external environment sensing module 130 may detect the three obstacles OB1, OB2, OB3, the host vehicle 110 is located on the lane R2, the obstacle OB1 is located on the lane R1 in the left hand side, the obstacle OB2 is located on the bikeway R3 in the right hand side, the obstacle OB3 is on the zebra crossing R4, the road is a multi-lane road, and the lane marking between the lane R1 and the lane R2 is a dash line. Hence, the lane marking type, the lane marking color and the road type of each of the obstacles OB1, OB2, OB3 may be obtained.

The collision possibility judging model includes two hidden layers, the different lane marking types, lane marking colors and road types with different weight values are input to the first hidden layer, and the estimated collision time of each of the obstacles OB1, OB2, OB3 are input to the second hidden layer, which can be shown in the condition (1).

$$P_{collision\_i} = LD_{type\_i} \times actfun\left(\sum W_{A\_i} + T_{collision\_i} \times \sum W_{B\_i} + \text{Bias}_1\right) + \quad (1)$$
$$LD_{color\_i} \times actfun\left(\sum W_{A\_i} + T_{collision\_i} \times \sum W_{B\_i} + \text{Bias}_2\right) +$$
$$\text{Road}_{type\_i} \times actfun\left(\sum W_{A\_i} + T_{collision\_i} \times \sum W_{B\_i} + \text{Bias}_3\right).$$

$P_{collision\_i}$ represents the collision possibility of each of the obstacles OB1, OB2, OB3. $LD_{type\_i}$ represents the lane marking type of each of the obstacles OB1, OB2, OB3. $LD_{color\_i}$ represents the lane marking color of each of the obstacles OB1, OB2, OB3. $\text{Road}_{type\_i}$ represents the road type of each of the obstacles OB1, OB2, OB3. $W_{A\_i}$ and $W_{B\_i}$ respectively represent parameters of the first hidden layer and the second hidden layer. $T_{collision\_i}$ represents the estimated collision time of each of the obstacles OB1, OB2, OB3. Bias1~Bias3 represents a bias. The actfun( ) represents an activation function.

In order to obtain the estimated collision time of each of the obstacles OB1, OB2, OB3, obtained information of the obstacles OB1, OB2, OB3, including a relative longitudinal distance, a relative lateral distance, a relative longitudinal velocity, a relative lateral velocity and a relative angle between each of the obstacles OB1, OB2, OB3 and the host vehicle 110 and so on, may be input to a constant acceleration model and a Kalman filter to smoothen a dynamic trajectory and predict a future trajectory. Therefore, a trajectory overlapping estimation between each of the obstacles OB1, OB2, OB3 and the host vehicle 110 may be conducted. That is to say, position dataset of each of the obstacles OB1, OB2, OB3 corresponding to each of time points may be known according to the prediction of the future trajectory, overlapping time record between each of the obstacles OB1, OB2, OB3 and the host vehicle 110 may be obtained, and thus the estimated collision time between each of the obstacles OB1, OB2, OB3 and the host vehicle 110 may be obtained. In addition, a moving intension of each of the obstacles OB1, OB2, OB3 may be estimated based on the prediction of the future trajectory, the lane marking type, the lane marking color and the road type, thereby increasing a calculating accuracy of the collision possibility. In the present disclosure, the collision possibility of the obstacle OB1 is the highest one, and the obstacle dataset of the obstacle OB1 is used to calculate the obstacle collision time as the condition (2).

$$TTC_{collision} = D_{rel}/V_{rel}. \tag{2}$$

$TTC_{collision}$ represents the obstacle collision time. $D_{rel}$ represents the relative distance between the obstacle OB1 and the host vehicle 110. $V_{rel}$ represents the relative velocity between the obstacle OB1 and the host vehicle 110.

The present disclosure may conduct longitudinal self-adaptive adjusting as avoiding collision. Hence, with consideration of the capability of the host vehicle 110 and the status of the road, the maximum deceleration threshold may be calculated. Furthermore, the longitudinal velocity and the suspension damper can be adjusted with the consideration of the obstacle collision time, the driving motion status, the cabin internal status, the propulsion module diagnosing dataset, the braking module diagnosing dataset and the suspension module diagnosing dataset of the host vehicle 110, and whether the driver takes over.

In this embodiment, a minimum one of the maximum braking deceleration and the maximum road deceleration is defined as the maximum deceleration threshold by the maximum deceleration threshold calculating unit 152, as shown in the conditions (3) to (5).

$$A_{x\_friction} = \mu g. \tag{3}$$

$$A_{x\_pressure} = F_{pressure}/m_{vehicle}. \tag{4}$$

$$A_{x\_max\_threshold} = \text{Min}(A_{x\_friction}, A_{x\_pressure}). \tag{5}$$

$\mu$ represents a friction coefficient between the road and the tire of the host vehicle 110, i.e., the road surface friction coefficient. The g represents the gravity acceleration. $A_{x\_friction}$ represents the maximum road deceleration provided by the surface of the road. $A_{x\_pressure}$ represents the maximum braking deceleration provided by the braking module 113 of the host vehicle 110. $F_{pressure}$ represents the maximum braking summary force acted on the tire. $m_{vehicle}$ represents the current mass of the host vehicle 110, including all the elements, articles, and passengers on the host vehicle 110. $A_{x\_max\_threshold}$ represents the maximum deceleration threshold.

The self-adaptive deceleration command calculating unit 153 may calculate the self-adaptive deceleration command according to the maximum deceleration threshold, the seatbelt dataset, the passenger standing dataset, the propulsion module diagnosing dataset, the braking module diagnosing dataset, the suspension module diagnosing dataset, and whether the driver takes over. Each of the seatbelt dataset and the passenger standing dataset may correspond to a weight value, and the weight value may be obtained by searching a table. The self-adaptive deceleration command may be calculated based on the condition (6).

$$A_{x\_cmd} = (ST_{flagweight} \times \text{Seatbelt}_{flagweight}) \times \tag{6}$$
$$(A_{x\_max\_threshold}) \times (!\text{Diagnosis}_i) \times (!\text{Driver}_{takeover}).$$

$A_{x\_cmd}$ represents the self-adaptive deceleration command. $\text{Seatbelt}_{flagweight}$ represents the weight value of the seatbelt dataset. $ST_{flagweight}$ represents the weight value of the passenger standing dataset. $!\text{Diagnosis}_i$ represents the propulsion module diagnosing dataset, the braking module diagnosing dataset, and the suspension module diagnosing dataset, $!\text{Diagnosis}_i$ is set to 1 if the diagnosing result is normal, and $!\text{Diagnosis}_i$ is set to 0 if the diagnosing result is abnormal. $!\text{Driver}_{takeover}$ represents whether the driver takes over, $!\text{Driver}_{takeover}$ is set to 0 if the driver takes over, and $!\text{Driver}_{takeover}$ is set to 1 if the driver does not take over. It is noted that, if the propulsion module diagnosing dataset, the braking module diagnosing dataset, and the suspension module diagnosing dataset are abnormal, the self-adaptive longitudinal controlling function is turned off, the driver is reminded that the module is abnormal by interaction scripts, and the control right returns to the driver.

The conditions (7) to (11) may be calculated and the system operating delay time is taken into consideration.

$$t_1 = (a_t - a_0)/J. \tag{7}$$

$$v_1 = v_{host} - (a_t/2) \times t_1. \tag{8}$$

$$t_2 = (v_1 - v_2)/a_t. \tag{9}$$

$$D_{brake} = (v_{host} \times t_{delaytime}) + ((v_{host} + v_1) \times t_1)/2 + (v_1 \times t_2)/2. \tag{10}$$

$$TTC_{threshold} = (D_{brake} + D_{safetyinterval})/V_{rel}. \tag{11}$$

$t_1$ represents a transient time required for the host vehicle 110 to arrive the self-adaptive deceleration command. $a_t$ represents the calculated self-adaptive deceleration command, i.e., $A_{x\_cmd}$. $a_0$ represents an initial longitudinal acceleration of the host vehicle 110. J represents a variation of the maximum longitudinal deceleration of the host vehicle 110. $v_1$ represents the longitudinal velocity as achieving the self-adaptive deceleration command of the host vehicle 110. $v_{host}$ represents the longitudinal velocity of the host vehicle 110 moves on the road. $v_2$ represents a target longitudinal velocity of the host vehicle 110, generally being equal to a front vehicle velocity or being stationary. $t_2$ represents a time required for the host vehicle 110 as lowering the longitudinal velocity $v_1$ to the target longitudinal velocity $v_2$ after achieving the self-adaptive deceleration command in a steady state. $D_{brake}$ represents a braking distance. $t_{delaytime}$ represents the system operating delay time. $D_{safetyinterval}$ represents a safe distance between the obstacle OB1 and the host vehicle 110. The braking point distance is a sum of the braking distance and the safe distance. $TTC_{threshold}$ represents the brake start-till-stop time. If the brake start-till-stop time is larger than or equal to the obstacle collision time, a collision may be happened, and thus the self-adaptive deceleration command output unit 154 provides the self-adaptive deceleration command to the propulsion module 112 and the braking module 113 for adjusting the longitudinal velocity, and provides the suspension damper command to the suspension module 114 for adjusting the suspension damper. One the contrary, if a collision will not happen, the self-adaptive deceleration command and the suspension damper command will not be output.

In other embodiments, the self-adaptive deceleration command output unit may provide a command to tighten the seatbelt or to actuate a regenerative braking function, but the present disclosure is not limited thereto.

The host vehicle 110 may further include a displaying module 116, the controller 150 may further include a warning unit 155 signally connected to the displaying module 116, and the warning unit 155 controls the displaying module 116 to exert at least one of a sound alarm and a visual alarm.

The displaying module 116 may include a plurality of panels and a plurality of speakers. The panels may show characters and/or patterns. The speakers may provide a sound. The panels and the speakers may be disposed in the driver cabin, the passenger cabin or at an outside of the cabin. As the system is abnormal, the warning unit 155 may control the displaying module 116 to exert the visual alarm, including controlling the panel to display the characters of "require driver intervention", and to exert the sound alarm, including controlling the speakers to provide a sound with an interval. As providing a before-collision alarm, characters of "attention! braking soon" may be displayed, and a sound with a different interval may be provided, but the present disclosure is not limited thereto.

Figure 3:
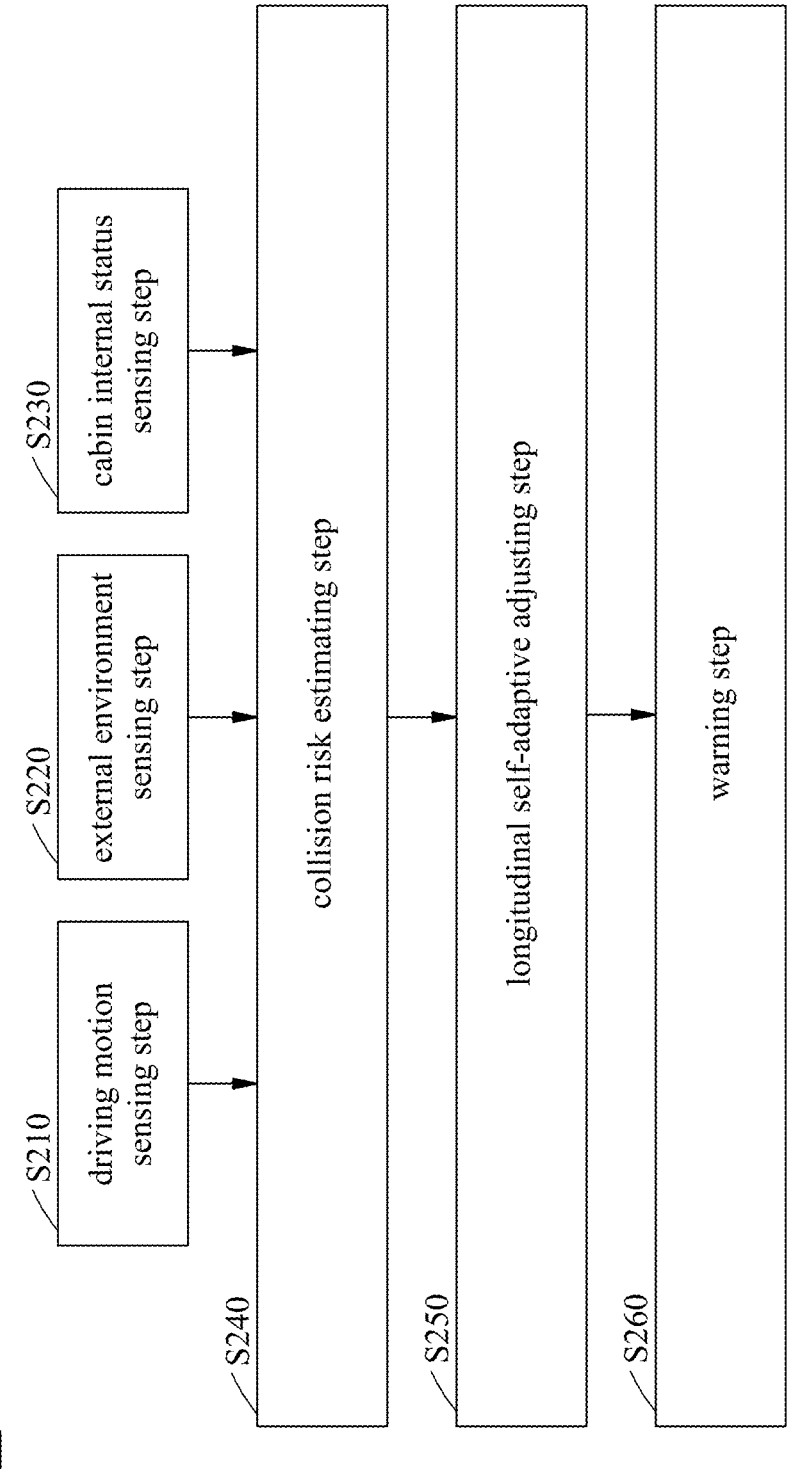
FIG. 3 shows a block flow diagram of an anti-collision longitudinal self-adaptive adjusting method according to one embodiment of the present disclosure.

FIG. 3 shows a block flow diagram of an anti-collision longitudinal self-adaptive adjusting method S200 according to another embodiment of the present disclosure. The anti-collision longitudinal self-adaptive adjusting method S200 includes a driving motion sensing step S210, an external environment sensing step S220, a cabin internal status sensing step S230, a collision risk estimating step S240, and a longitudinal self-adaptive adjusting step S250. The details of the anti-collision longitudinal self-adaptive adjusting method S200 may be described with the references of the anti-collision longitudinal self-adaptive adjusting system 100 in FIGS. 1 and 2.

In the driving motion sensing step S210, the braking module 113 of the host vehicle 110 obtains the longitudinal velocity and the road surface friction coefficient as the host vehicle 110 moves on the road, and the suspension module 114 of the host vehicle 110 obtains the suspension damper as the host vehicle 110 moves on the road.

In the external environment sensing step S220, the external environment sensing module 130 detects the obstacle OB1, OB2, OB3.

In the cabin internal status sensing step S230, the seatbelt detecting unit 141 detects whether at least a sitting member of the passengers P1, P2, P3, P4, P5 on the host vehicle 110 is present so as to obtain the seatbelt dataset, and a passenger standing detecting unit 142 detects whether at least a standing member of the passengers P1, P2, P3, P4, P5 is present so as to obtain the passenger standing dataset.

In the collision risk estimating step S240, the controller 150 calculates the obstacle collision time according to the obstacle OB1, OB2, OB3 detected by the external environment sensing module 130.

In the longitudinal self-adaptive adjusting step S250, the maximum deceleration threshold calculating unit 152 of the controller 150 calculates the maximum deceleration threshold according to the maximum braking deceleration of the braking module 113 and the maximum road deceleration corresponding to the road surface friction coefficient. The self-adaptive deceleration command calculating unit 153 of the controller 150 calculates the self-adaptive deceleration command at least according to the maximum deceleration threshold, the seatbelt dataset and the passenger standing dataset and calculates the suspension damper command according to the self-adaptive deceleration command. The self-adaptive deceleration command output unit 154 of the controller 150 calculates the braking point distance at least according to the system operating delay time and the self-adaptive deceleration command so as to obtain the brake start-till-stop time. If the brake start-till-stop time is larger than or equal to the obstacle collision time, the self-adaptive deceleration command is output to the propulsion module 112 and the braking module 113 for adjusting the longitudinal velocity, and the suspension damper command is output to the suspension module 114 for adjusting the suspension damper.

The driving motion sensing step S210, the external environment sensing step S220 and the cabin internal status sensing step S230 may obtain the relative information about the driving motion, the external environment and the cabin internal status, and the collision risk estimating step S240 and the longitudinal self-adaptive adjusting step S250 may use the information.

In the external environment sensing step S220, the number of the obstacle OB1, OB2, OB3 is plural. In the collision risk estimating step S240, the collision risk estimating unit 151 calculates the collision possibility of each of the obstacles OB1, OB2, OB3, and calculates the obstacle collision time according to the obstacle dataset of the obstacle OB1, OB2, OB3 that corresponds to a highest one of the collision possibilities. In the collision risk estimating step S240, the collision risk estimating unit 151 calculates the collision possibility of each of the obstacles OB1, OB2, OB3 based the collision possibility judging model. The collision possibility judging model includes at least two hidden layers, the lane marking type, the lane marking color and the road type obtained by the external environment sensing module 130 or the network sensing device 120 are input to the collision possibility judging model, and the estimated collision time of each of the obstacles OB1, OB2, OB3 are considered to obtain the collision possibility of each of the obstacles OB1, OB2, OB3.

That is to say, in the collision risk estimating step S240, the controller 150 may analyze the objects in the region of interest to identify the obstacles OB1, OB2, OB3. The future trajectory of each of the obstacles OB1, OB2, OB3 may be calculated based on the obstacle datasets of the obstacles OB1, OB2, OB3, and the trajectory overlapping estimation between each of the obstacles OB1, OB2, OB3 and the host vehicle 110 may be conducted based thereon, thereby obtaining the estimated collision time between each of the obstacles OB1, OB2, OB3 and the host vehicle 110. After which, the collision possibility judging model may be used to obtain the collision possibility of each of the obstacles OB1, OB2, OB3 based on the condition (1), thereby finding the obstacle OB1 being the one with the highest collision possibility. After which, the obstacle dataset of the obstacle OB1 is used to calculate the obstacle collision time based on the condition (2).

In the longitudinal self-adaptive adjusting step S250, the minimum one of the maximum braking deceleration and the maximum road deceleration is defined as the maximum deceleration threshold by the maximum deceleration threshold calculating unit 152 based on the conditions (3) to (5). The self-adaptive deceleration command calculating unit 153 calculates the self-adaptive deceleration command according to the maximum deceleration threshold, the seatbelt dataset, the passenger standing dataset, the propulsion module diagnosing dataset, the braking module diagnosing dataset, the suspension module diagnosing dataset and whether the driver takes over based on the condition (6). The longitudinal self-adaptive adjusting step S250 may also judge whether a collision may occur with the brake start-till-stop time based on the conditions (7) to (11). If the collision may occur, the self-adaptive deceleration command and the suspension damper command are output to lower the possibility that the passengers P1, P2, P3, P4, P5 may be injured.

The anti-collision longitudinal self-adaptive adjusting method S200 may further include a warning step S260. The warning unit 155 of the controller 150 controls the displaying module 116 of the host vehicle 110 to exert at least one of a sound alarm and a visual alarm. Therefore, the driver and the passengers P1, P2, P3, P4, P5 may be warned, and the safety is increased.

It is known with the aforementioned embodiments, with the network information, i.e., information provided by the network sensing device, the various detectors, i.e., the external environment sensing module and the cabin internal status sensing module, and the vehicle driving motion, the collision risk estimating unit may judge the environment and the obstacle relation to estimate the collision risk. The longitudinal driving control, i.e., the maximum deceleration threshold calculating unit, the self-adaptive deceleration command calculating unit and the self-adaptive deceleration command output unit, may adjust the vehicle chassis system controlling command, i.e., the command for the propulsion module, the braking module and the suspension module, based on the posture of the passengers, i.e., the standing posture or seating posture, and the body limitation of the driver and the passengers, i.e., the seatbelt limitation, to increase the safety or to lower the possibility that the passengers may be injured in the process of deceleration. The driver and the passengers may be warned by the warning unit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An anti-collision longitudinal self-adaptive adjusting system, comprising:
  a host vehicle, comprising:
    a plurality of wheels;
    a propulsion module configured to provide a power to the wheels;
    a braking module configured to provide a braking force to the wheels and to obtain a longitudinal velocity and a road surface friction coefficient as the host vehicle moves on a road; and
    a suspension module connected to the wheels and configured to obtain a suspension damper as the host vehicle moves on the road;
  an external environment sensing module disposed at the host vehicle, the external environment sensing module configured to detect at least one obstacle;
  a cabin internal status sensing module disposed at the host vehicle and comprising:
    a seatbelt detecting unit configured to detect whether at least a sitting member of a plurality of passengers on the host vehicle is present so as to obtain a seatbelt dataset; and a passenger standing detecting unit configured to detect whether at least a standing member of the passengers is present so as to obtain a passenger standing dataset; and
  a controller electrically connected to the suspension module, the propulsion module, the braking module, the external environment sensing module and the cabin internal status sensing module, the controller comprising:
    a collision risk estimating unit configured to calculate an obstacle collision time according to the at least one obstacle detected by the external environment sensing module;
    a maximum deceleration threshold calculating unit configured to calculate a maximum deceleration threshold according to a maximum braking deceleration of the braking module and a maximum road deceleration corresponding to the road surface friction coefficient;
    a self-adaptive deceleration command calculating unit configured to calculate a self-adaptive deceleration command at least according to the maximum deceleration threshold, the seatbelt dataset and the passenger standing dataset and to calculate a suspension damper command according to the self-adaptive deceleration command; and
    a self-adaptive deceleration command output unit configured to calculate a braking point distance at least according to a system operating delay time and the self-adaptive deceleration command so as to obtain a brake start-till-stop time, wherein if the brake start-till-stop time is larger than or equal to the obstacle collision time, the self-adaptive deceleration command is output to the propulsion module and the braking module for adjusting the longitudinal velocity, and the suspension damper command is output to the suspension module for adjusting the suspension damper.

2. The anti-collision longitudinal self-adaptive adjusting system of claim 1, wherein the propulsion module provides a propulsion module diagnosing dataset, the braking module provides a braking module diagnosing dataset, the suspension module provides a suspension module diagnosing dataset, and the self-adaptive deceleration command calculating unit calculates the self-adaptive deceleration command according to the maximum deceleration threshold, the seatbelt dataset, the passenger standing dataset, the propulsion module diagnosing dataset, the braking module diagnosing dataset and the suspension module diagnosing dataset.

3. The anti-collision longitudinal self-adaptive adjusting system of claim 1, wherein a minimum one of the maximum braking deceleration and the maximum road deceleration is defined as the maximum deceleration threshold by the maximum deceleration threshold calculating unit.

4. The anti-collision longitudinal self-adaptive adjusting system of claim 1, wherein a number of the at least one obstacle is plural, the collision risk estimating unit calculates a collision possibility of each of the obstacles, and calculates the obstacle collision time according to an obstacle dataset of the obstacle that corresponds to a highest one of the collision possibilities.

5. The anti-collision longitudinal self-adaptive adjusting system of claim 4, wherein the collision risk estimating unit comprises a collision possibility judging model, the collision possibility judging model comprises at least two hidden layers, a lane marking type, a lane marking color and a road type obtained by the external environment sensing module or a network sensing device are input to the collision possibility judging model, and an estimated collision time of each of the obstacles are considered to obtain the collision possibility of each of the obstacles.

6. The anti-collision longitudinal self-adaptive adjusting system of claim 1, wherein the host vehicle further comprises a displaying module, the controller further comprises a warning unit signally connected to the displaying module, and the warning unit controls the displaying module to exert at least one of a sound alarm and a visual alarm.

7. An anti-collision longitudinal self-adaptive adjusting method, comprising:

a driving motion sensing step, wherein a braking module of a host vehicle obtains a longitudinal velocity and a road surface friction coefficient as the host vehicle moves on a road, and a suspension module of the host vehicle obtains a suspension damper as the host vehicle moves on the road;

an external environment sensing step, wherein an external environment sensing module detects at least one obstacle;

a cabin internal status sensing step, wherein a seatbelt detecting unit detects whether at least a sitting member of a plurality of passengers on the host vehicle is present so as to obtain a seatbelt dataset, and a passenger standing detecting unit detects whether at least a standing member of the passengers is present so as to obtain a passenger standing dataset;

a collision risk estimating step, wherein a controller calculates an obstacle collision time according to the at least one obstacle detected by the external environment sensing module; and a longitudinal self-adaptive adjusting step, wherein a maximum deceleration threshold calculating unit of the controller calculates a maximum deceleration threshold according to a maximum braking deceleration of the braking module and a maximum road deceleration corresponding to the road surface friction coefficient, a self-adaptive deceleration command calculating unit of the controller calculates a self-adaptive deceleration command at least according to the maximum deceleration threshold, the seatbelt dataset and the passenger standing dataset and calculates a suspension damper command according to the self-adaptive deceleration command, a self-adaptive deceleration command output unit of the controller calculates a braking point distance at least according to a system operating delay time and the self-adaptive deceleration command so as to obtain a brake start-till-stop time, if the brake start-till-stop time is larger than or equal to the obstacle collision time, the self-adaptive deceleration command is output to a propulsion module and the braking module for adjusting the longitudinal velocity, and the suspension damper command is output to the suspension module for adjusting the suspension damper.

8. The anti-collision longitudinal self-adaptive adjusting method of claim 7, wherein in the longitudinal self-adaptive adjusting step, the propulsion module provides a propulsion module diagnosing dataset, the braking module provides a braking module diagnosing dataset, the suspension module provides a suspension module diagnosing dataset, and the self-adaptive deceleration command calculating unit calculates the self-adaptive deceleration command according to the maximum deceleration threshold, the seatbelt dataset, the passenger standing dataset, the propulsion module diagnosing dataset, the braking module diagnosing dataset and the suspension module diagnosing dataset.

9. The anti-collision longitudinal self-adaptive adjusting method of claim 7, wherein in the longitudinal self-adaptive adjusting step, a minimum one of the maximum braking deceleration and the maximum road deceleration is defined as the maximum deceleration threshold by the maximum deceleration threshold calculating unit.

10. The anti-collision longitudinal self-adaptive adjusting method of claim 7, wherein in the external environment sensing step, a number of the at least one obstacle is plural, in the collision risk estimating step, the collision risk estimating unit calculates a collision possibility of each of the obstacles, and calculates the obstacle collision time according to an obstacle dataset of the obstacle that corresponds to a highest one of the collision possibilities.

11. The anti-collision longitudinal self-adaptive adjusting method of claim 10, wherein in the collision risk estimating step, the collision risk estimating unit calculates the collision possibility of each of the obstacles based a collision possibility judging model, the collision possibility judging model comprises at least two hidden layers, a lane marking type, a lane marking color and a road type obtained by the external environment sensing module or a network sensing device are input to the collision possibility judging model, and an estimated collision time of each of the obstacles are considered to obtain the collision possibility of each of the obstacles.

12. The anti-collision longitudinal self-adaptive adjusting method of claim 10, further comprising a warning step, wherein a warning unit of the controller controls a displaying module of the host vehicle to exert at least one of a sound alarm and a visual alarm.

* * * * *